United States Patent

Boldrini et al.

[11] Patent Number: 5,954,183
[45] Date of Patent: Sep. 21, 1999

[54] DEVICE FOR THE TRANSFER OF PRODUCTS

[75] Inventors: Fulvio Boldrini, Ferrara; Lorenzo Maldina, Bologna, both of Italy

[73] Assignee: G.D.S.P.A., Bologna, Italy

[21] Appl. No.: 08/845,212

[22] Filed: Apr. 21, 1997

[30] Foreign Application Priority Data

Apr. 22, 1996 [IT] Italy ................................ BO96A0213

[51] Int. Cl.⁶ .................................................. B65G 47/44
[52] U.S. Cl. .................. 198/360; 198/474.1; 198/479.1; 198/722; 414/796.8
[58] Field of Search .............................. 198/474.1, 476.1, 198/477.1, 479.1, 722, 740, 457.07, 468.1, 360, 719; 414/796.8, 796.7

[56] References Cited

U.S. PATENT DOCUMENTS

| | | |
|---|---|---|
| 2,292,800 | 8/1942 | Rose ...................................... 198/468.1 |
| 3,680,280 | 8/1972 | Stancari . |
| 3,791,515 | 2/1974 | Wood ....................................... 198/360 |
| 3,831,780 | 8/1974 | Skarin et al. .......................... 414/796.7 |
| 4,219,112 | 8/1980 | Lowenthal . |
| 4,250,988 | 2/1981 | Miaskoff .................................. 198/719 |
| 4,548,313 | 10/1985 | Occhialini et al. . |
| 4,773,525 | 9/1988 | Gertitschke et al. ................ 198/476.1 |
| 5,060,783 | 10/1991 | Chenevard et al. .................. 198/468.1 |
| 5,131,804 | 7/1992 | Focke et al. .......................... 414/796.8 |

FOREIGN PATENT DOCUMENTS 594 397  4/1994  European Pat. Off. .

Primary Examiner—Joseph E. Valenza
Attorney, Agent, or Firm—Pillsbury Madison & Sutro LLP

[57] ABSTRACT

A device for the transfer of products from the upper terminal section of a first vertical conveyor belt to an initial section of a horizontal channel of reception and advancement along a feed line of the products themselves, which channel comprises at least one pushing element located at the terminal section of the conveyor belt and having continuous motion along a closed trajectory.

10 Claims, 1 Drawing Sheet

DEVICE FOR THE TRANSFER OF PRODUCTS

BACKGROUND OF THE INVENTION

The present invention rates to a device for the transfer of products.

In particular the invention pertains to the field of the technique relating to devices for of transferring products such as, for example, cigarette packets, from a vertical conveyor belt to a reception channel positioned. With it advancement direction, substantially transversely to that of the conveyor belt itself.

A transfer of such type is often necessary in the field of wrapping machines Wherein the products have a substantially parallelepiped shape and have to be transferred by an intermittent advancement vertical conveyor belt, which moves forward the products stacked on onto the other to a horizontal reception channel which moves forward the products one behind the other.

The transfer devices already known are of a mechanical type and are usually constituted by a mobile pushing element with alternative motion and aligned to the reception channel. Said pushing element is movable between a backward position, taken up during the lifting of the products by the vertical conveyor belt and a forward position wherein the pushing element itself delivers to the reception channel one or more products taken from the stack of products fed by the vertical conveyor belt.

Such transfer device is simple but has notable operating and kinematic limits, in that the vertical conveyor belt cannot make the stack of products rise until the pushing element is brought into the backward position. This means that the length of the stroke of the pushing element and its speed represent a key factor for determining the duration of the stopping phase of the vertical conveyor belt, In order to reduce the duration of said stopping phase, or to increase the operating speed of the conveyor belts, it is possible to reduce the stroke of the pushing element or to increase its speed. The reduction of the stroke sometimes cannot be carried out, whereas the increase of the speed is not possible above certain values due to the alternative motion of the pushing element.

With the transfer devices of a known type described above, it is not therefore possible to increase beyond certain limits the operating speed of the machine to which the above mentioned transfer device relates.

The object of the present invention is to provide a mechanical transfer device capable of functioning at a considerable operating speed, and capable of, consequently, being applied to wrapping machines operating at a very high speed.

SUMMARY OF THE INVENTION

The stated object is realized in a device for transferring the products from a terminal section of a vertical conveyor belt to an initial section of a reception and advancement horizontal channel, along a feed line of said products, wherein the device comprises at least a pushing element which is located at the terminal section of said conveyor belt and which has continuous motion according to a closed trajectory, placed and shaped in such a way as to move, from time to time, the single products which reach said terminal section of the conveyor belt, thus pushing them towards said reception and advancement channel,

BRIEF DESCRIPTION OF THE DRAWINGS

The invention will now be described in detail, by way of example, with the aid of the accompnying drawings in which.

DESCRIPTION OF THE PREFERRED EMBODIMENTS

With reference to the figures in the accompanying drawings, 1 denotes the transfer device object of the present invention as a whole being positioned between a product conveyor belt 4, denoted with 2, and a feed line 10 comprising a horizontal reception channel 3 of the products 4 themselves.

Figure 1:
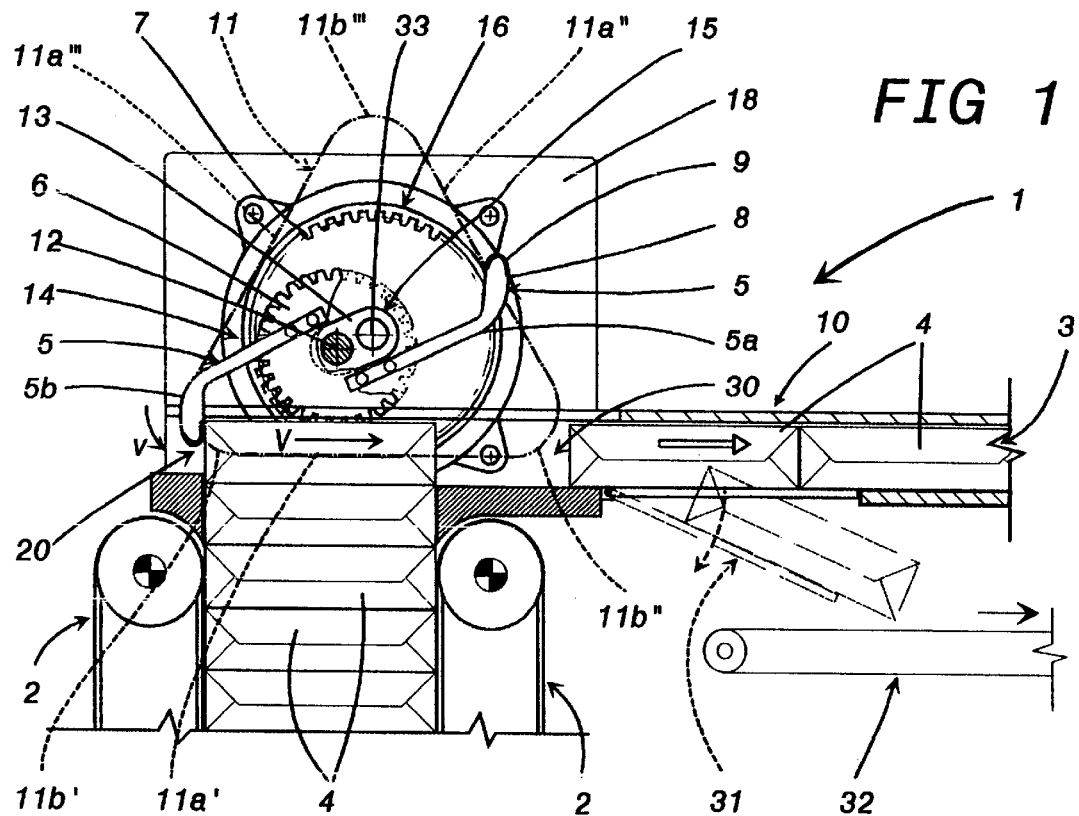
FIG. 1 shows a schematic side view of a transfer device obtained according to the present invention.

In the embodiment in FIG. 1 the reception channel 3, as an example, does not envisage transfer means in that the products 4 are pushed one behind the other until reaching an area, not illustrated, of subsequent hold and working of the products themselves.

Figure 2:
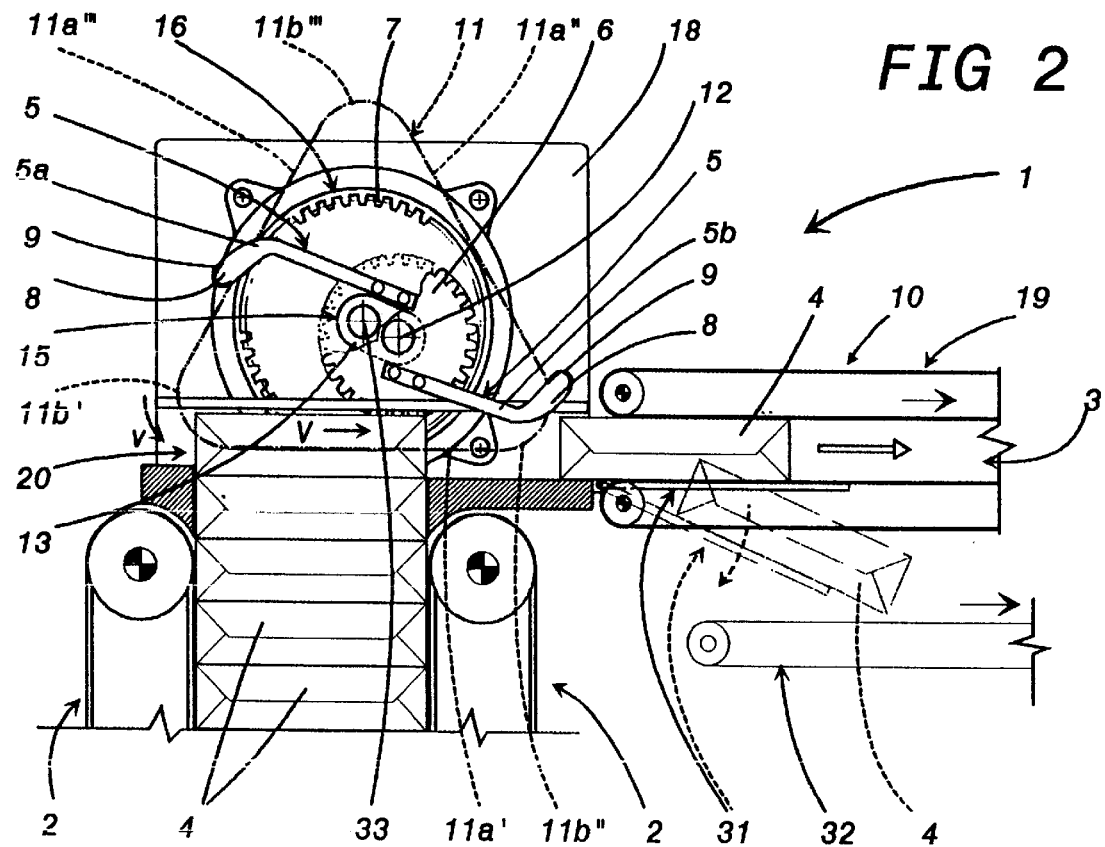
FIG. 2 shows the same view as that in FIG. 1, and it is relative to a different operating moment of the transfer device of FIG. 1 itself.

In the embodiment in FIG. 2, the reception channel 3 though, includes a further conveyor belt 19. The conveyor belts 2 and 19 are both constituted by one couple of motorized belts of a known type.

The conveyor belt 2 unfolds along a vertical direction and lifts, with intermittent movement, the products 4 stacked one on the other.

At an initial section 30 of the channel 3 is envisaged a product-rejection device 4, which comprises a diverter 31 which is normally kept horizontal but can be inclined to reject the faulty products 4 by making them fall onto a conveyor belt 32, from which the products 4 themselves are brought into a collecting area not illustrated.

The device 1 is interposed between the initial section, denoted with 20, of the vertical conveyor belt 2 and the initial section 30 of the reception and advancement channel 3, and it is constituted by at least a pushing element 5 which always moves in a determined direction, that is with a unidirectional motion, according to a closed trajectory 11.

In this way, for moving a product 4 it is not necessary to wait for the pushing element 5 to carry out the return stroke described above. In fact, the pushing element 5, moving along a loop closed trajectory, carries out the return stroke in an area which is found outside the transfer area of the products 4. The products 4 can be lifted, so as to be ready for the transfer by the pushing element 5, during the return stroke of the pushing element 5 itself.

The trajectory 11 comprises an intermediate section 11a', substantially lying on the feed line 10 of the products 4, and along which the pushing element 5 removes the products 4 with removal speed V.

Said section 11a' can be constituted by an arch of circle having a large radius of curvature, but it is preferably constituted by a section which is substantially rectilinear.

The above mentioned closed trajectory 11 includes, at the interception point of a product 4, at the beginning of tie intermediate section 11a', a section 11b' having a small radius of curvature, wherein the pushing element 5 has a contact speed v which is lower than the above mentioned removal speed V, in such a way as to avoid violent blows onto the product 4 by the pushing element 5 itself.

In the preferred embodiment, the trajectory 11 includes, other than section 11a' two sections 11a" and 11a'" which are substantially rectilinear and are the same length as the section 11a' itself. The three rectilinear sections are joined by three curved sections 11b', 11b", 11b'" having a small radius of curvature.

The shape of said trajectory substantially reproduces that of an equilateral triangle having rounded vertexes, said geometric shape being defined in technical terms as tricusp hypocycloid.

The trajectory 11 is described by an end 8 of the pushing element 5. In the specific case of the pushing element 5 there are two pushing elements 5a, 5b, which are vane shaped and have the end slightly arched in the direction of the movement of the products 4.

The above mentioned trajectory 11 is obtained by equipping the device 1 with a gearing 14.

The gearing 14 essentially comprises a toothed wheel 6 and a circular crown 7 of a greater radius, equipped with internal toothing. The circular crown 7 is constrained to a part 18 of the machine, being therefore fixed. The wheel 6, in turn, is mounted idly onto a pivot 12 which is found at the end of a crank 13, The crank 13 is placed in rotation in a clockwise direction by a shaft 33 which is connected to drive means of a known type. The distance between the axis of the shaft 33, about which rotates the crank 13, and the axis of the pivot 12 equal to the difference between the radius of the wheel 6 and that of the circular crown 7. When the crank 13 rotates, the pivot 12 defines a periphery of radius equal to the difference between the radius of the wheel 6 and that of the circular crown 7.

Due to said rotation of the crank 13, the wheel 6, being idly mounted onto the pivot 12 and being engaged to the wheel 7, is forced to roll counter-clockwise inside the wheel 7. The two pushing elements 5a, 5b are parallely fixed, at a certain distance one from the other, with respect to a diameter of the wheel 6.

Due to the distance between the axes of the pushing elements, and due to the fact that the pushing elements 5a, 5b have ends 8 orientated in opposite directions one with respect to the other, the ends 8 of the pushing elements 5a, 5b are nearly found on the extension of a diameter of the wheel 6. An advantage of the gearing 14 described above is that it gives the pushing element 5 different speeds in the curves and rectilinear sections of the trajectory 11.

In fact, in the curved sections, and therefore also in the section 11b' of interception of the products 4, the end 8 of the pushing element 5 moves at a lower contact speed v, while in the rectilinear sections the removal speed V increases until it reaches a maximum level in proximity of the half of the rectilinear sections themselves.

In this way there is an improvement of the impact conditions of the pushing element 5 against the products 4 and there is a greater transfer speed.

This happens because the distance between the contact point in which the engagement of the wheel 6 and the circular crown 7 comes about and the end of the pushing elements 5 is lowest in the curved sections 11b', 11b", 11b'" and is highest in proximity of the half of the rectilinear sections 11a, 11a" 11a'" in fact, being the contact point, between the wheel 6 and the circular crown 7, the centre of the instantaneous rotation of the wheel 6 and therefore also that of the pushing element 5, it is obvious that, by maintaining the same speed as the wheel 6 constant, in the curved sections 11b', 11b", 11b'", wherein the distance between the rotation centre and the end 8 of the pushing element 5 is less, the speed at which the pushing element 5 itself moves is lower. Instead, in the rectilinear sections 11a', 11a", 11a'", wherein the distance between the rotation centre and the end 8 of the pushing element 5 progressively increases, the speed at which the pushing element 5 itself moves is greater.

In order to deaden the blow between the end 8 of the pushing element 5 and the product 4, a portion 9 made of resilient elastic material can be envisaged on the end 8.

What is claimed:

1. A device for the transfer of products from the upper terminal section of a first vertical conveyor belt to the initial section of a horizontal channel of reception and advancement, along a feed line of the products, characterized in that it comprises at least a pushing element which is located at the terminal section of said conveyor belt, said pushing element having a continuous motion according to a closed trajectory placed and shaped in such a way as to remove, from time to time, the single products which reach said terminal section of the conveyor belt thus pushing them towards said reception and advancement channel, wherein the closed trajectory along which the pushing element moves is obtained by equipping the device itself with a gearing, located at said terminal section of said conveyor belt and wherein a mobile toothed wheel, to which the pushing element is constrained, rolls on contact with a toothed path which is closed and fixed, operated by motorized means.

2. A device as in claim 1, wherein said pushing element is placed above the terminal section of said conveyor belt above the products and before the initial section of said reception and transfer channel.

3. A device as in claim 1, wherein said pushing element moves according to said closed trajectory along which determined at least an interception section of a product, at which the pushing element moves forward with a certain contact speed, and a feed section of the products, along which the pushing element moves forward at a determined feed speed; said contact speed being lower than said feed speed and such as to avoid violent blows on the product.

4. A device as in claim 3, wherein said interception section is a curvilinear section.

5. A device as in claim 3, wherein said feed section is a substantially rectilinear section.

6. A device as in claim 1, wherein said fixed closed toothed path is constituted by a toothed circular crown inside which said toothed wheel rolls tangentially.

7. A device as in claim 1, wherein said closed trajectory comprises three feed sections which are substantially rectilinear and the same length, along which the pushing element moves at said removal speed, said feed sections being joined by three interception curvilinear sections, along which the pushing element moves at said contact speed.

8. A device as claimed in claim 1, comprising at least two pushing devices diametrically opposed with respect to the toothed wheel, each of said pushing elements having an end arched and orientated in the forward direction of the products; said end being found substantially on the extension of a diameter of the toothed wheel itself.

9. A device as claimed in claim 1, wherein the end of the pushing element comprises a part made of resilient elastic material which is capable of deadening the blows.

10. A device as claimed in claim 1, comprising a product-rejection device of the products placed along said horizontal channel.

* * * * *